United States Patent

Kondo

[11] 3,904,250
[45] Sept. 9, 1975

[54] ANTI-SKID BRAKE MECHANISM
[75] Inventor: Toshihiyuki Kondo, Toyota, Japan
[73] Assignee: Aisin Seiki Kabushiki Kaisha, Japan
[22] Filed: May 4, 1973
[21] Appl. No.: 357,169

[30] Foreign Application Priority Data
May 5, 1972 Japan............................ 47-44426

[52] U.S. Cl............................. 303/21 F; 303/21 AF
[51] Int. Cl................................................ B60t 8/00
[58] Field of Search .................. 303/21 F, 21 AF; 188/181 A

[56] References Cited
UNITED STATES PATENTS
| | | |
|---|---|---|
| 3,556,615 | 1/1971 | Stelzer............................ 303/21 F |
| 3,669,403 | 6/1972 | Slavin et al...................... 303/21 F |
| 3,706,971 | 12/1972 | Okamoto et al................ 303/21 AF |

*Primary Examiner*—Trygve M. Blix
*Assistant Examiner*—Charles E. Frankfort
*Attorney, Agent, or Firm*—Oblon, Fisher, Spivak, McClelland & Maier

[57] ABSTRACT

An anti-skid brake mechanism including a master cylinder generating hydraulic pressure, wheel brake cylinders connected to the master cylinder by a hydraulic braking circuit, a skid sensing signal generator, a pump powered hydraulic pressure source, a reservoir hydraulically connected to the pressure source, a cut off valve interposed between the master cylinder and the wheel brake cylinders within the braking circuit for controlling the hydraulic communication therebetween, a hydraulic pressure reducer interposed between the cut off valve and wheel brake cylinders within the braking circuit and including a housing with a piston member slidably fitted therein and cooperatively connected to the cut off valve, an electro-magnetic change over valve selectively communicating the pressure reducer with the pressure source and reservoir in response to a skid sensing signal, and a spring for biasing the piston member against sliding resistance, the spring being interposed between the electro-magnetic valve assembly and hydraulic pressure reducer with the biasing force being at least greater than the sliding force of the piston member.

6 Claims, 3 Drawing Figures 3,904,250

ANTI-SKID BRAKE MECHANISM

BACKGROUND OF THE INVENTION

1. Field of the Invention

This invention relates generally to an anti-skid brake mechanism, and more particularly to an anti-skid brake control system having a pump powered hydraulic actuator which is actuated to control the braking pressure in response to a signal indicating a rotational condition of a wheel by using an electro-magnetic valve assembly.

2. Description of the Prior Art

The conventional mechanism of this type has such a drawback that when the wheels are locked or likely to be locked because of the smaller valve of the adhesive coefficient (($\wedge^1$)) between the tires and the road surface, that is, in case low braking pressure is applied under anti-skid operation, due to the sliding resistance of the piston of the hydraulic pressure reducing means, the pressure reducing operation can not be smoothly performed and accordingly the pressure reducing time might be prolonged.

SUMMARY OF THE INVENTION

It is, therefore, an object of the invention to provide an improved anti-skid brake mechanism for obviating the above conventional drawback.

Another object of the present invention is to provide an improved anti-skid brake mechanism which requires less strictness in manufacture of those parts which create sliding resistance of the piston of the hydraulic pressure reducing means.

A further object of the present inventin is to provide an improved anti-skid brake mechanism wherein the pressure reducing operation under a skid condition will function smoothly and with assurance.

A still further object of the present invention is to provide an improved anti-skid brake mechanism which includes means for overcoming the sliding resistance of the piston of the hydraulic pressure reducing means such that the pressure reducing operation can be smoothly performed and the pressure reducing time is minimized.

The foregoing and other objects are attained by an anti-skid brake mechanism including a master cylinder generating hydraulic pressure, wheel brake cylinders connected to the master cylinder by a hydraulic braking circuit a skid sensing signal generator, a pump powered hydraulic pressure source, a reservoir hydraulically connected to the pressure source, a cut off valve interposed between the master cylinder and the wheel brake cylinders within the braking circuit for controlling the hydraulic communication therebetween, a hydraulic pressure reducer interposed between the cut off valve and wheel brake cylinders within the braking circuit and including a housing with a piston member slidably fitted therein and cooperatively connected to the cut off valve, an electro-magnetic change over valve selectively communicating the pressure reducer with the pressure source and reservoir in response to a skid sensing signal, and means for biasing the piston member against sliding resistance, the biasing means being interposed between the electro-magnetic valve assembly and hydraulic pressure reducer with the biasing force being at least greater than the sliding force of the piston member.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
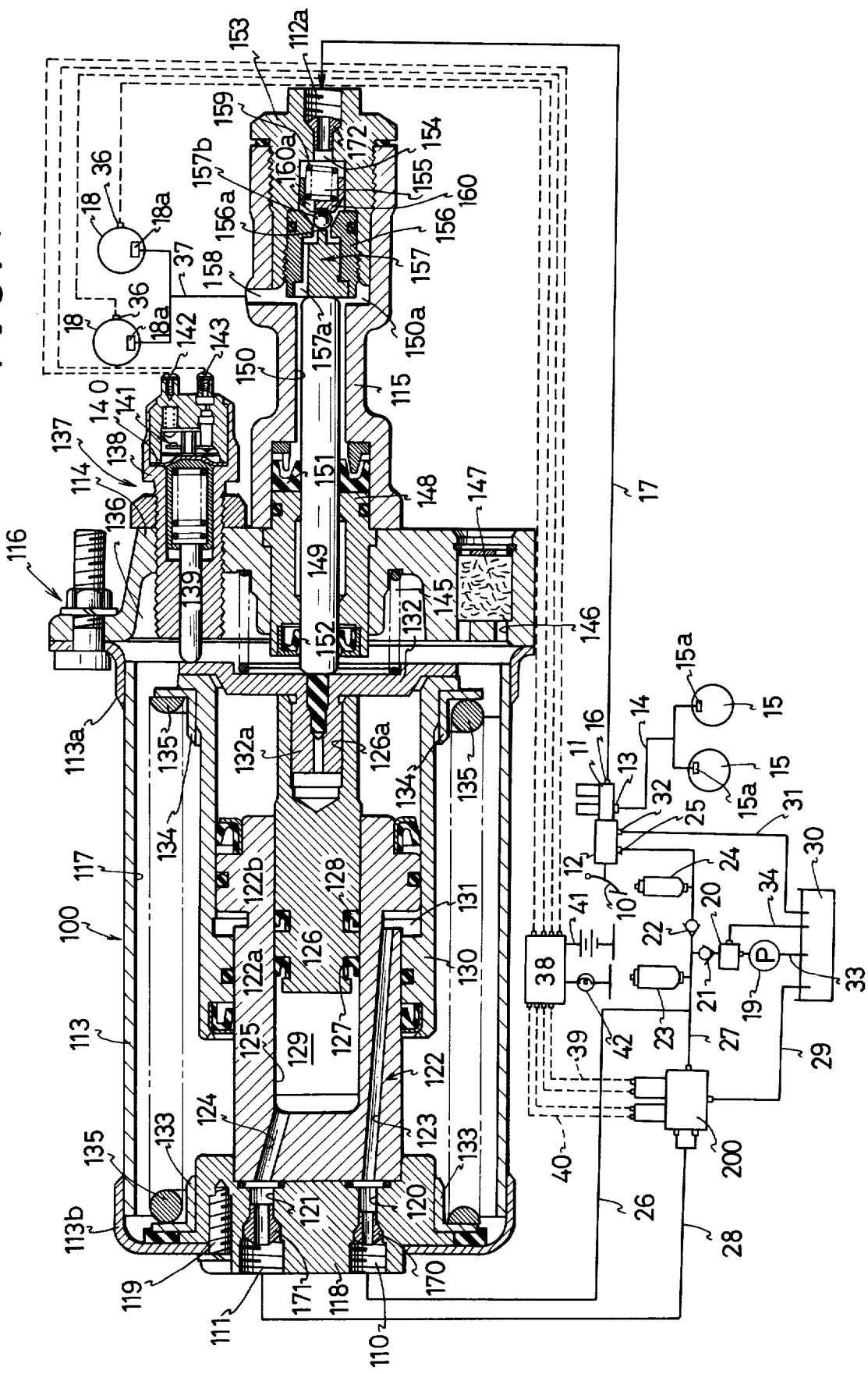
FIG. 1 is a schematic view of an anti-skid brake mechanism constructed according to the invention and illustrating the components thereof as they are under non-operation condition.

Referring now to the drawings wherein like reference characters are used to designate the same or similar parts in the several views, and more particularly to FIG. 1, a brake pedal 10 is hydraulically connected to a tandem master cylinder 11 via a brake booster 12. The master cylinder 11 is connected to wheel brake cylinders 15a of wheels 15 through a port 13 and conduit 14 and is also connected to wheel brake cylinders 18a of wheels 18 through a port 16 and conduit 17. Numeral 19 denotes a pump which is driven by the engine, not shown, and is connected to two accumulators 23, 24 through an unloader valve 20, and check valves 21, 22. One accumulator 24 is connected to the brake booster 12 via a port 25 thereof, while the other accumulator 23 is connected to an anti-skid actuator 100 through a conduit 26 or through a conduit 27 by means of a control valve assembly 200, which is described hereinafter in detail, and a conduit 28. Control valve 200 is also connected to a reservoir 30 via a conduit 29 and the reservoir 30 is further being connected to the pump 19 and the unloader valve 20 via conduits 33 and 34, respectively, and is connected to the brake booster 12 via a port 32 thereof, by means of conduit 31. A computer means 38 is electrically connected to the control valve 200 via conductors 39, 40 and actuates the control valve 200 in response to a skid signal generated in sensors 36. Numeral 41 is a battery and an alarming lamp 42 is connected to the computer means 38 and is actuated in response to the actuation of a switch means 137 attached to the actuator 100.

Now referring to a detail construction of the actuator 100 which includes first, second and third housings 113, 114 and 115, the first and second housings 113, 114 are securely connected to each other by means of a plurality of bolt-nut assemblies 116 through a cover member 113a of the first housing 113. A cylinder 117 is provided within the first housing 113 at the left end of which is connected a plug body 118 by means of bolts 119 extending through a cover 113b. The plug body 118 is provided with two ports 110 and 111 which are respectively connected to passages 120, 121 also provided in the plug body 118. A power cylinder 122 is provided within the cylinder 117 and is secured at the left end thereof to the plug body 118. The passages 120, 121 of the plug body 118 are further respectively connected to passages 123, 124 provided in the power cylinder 122. The power cylinder 122 has two different diameter portions 122a, 122b and a recess 125 in which a piston 126 is slidably sealingly mounted. Therefore, a hydraulic chamber 129 is defined within the recess 125 by means of the piston 126 and is in communication with the control valve 200 via the passages 124, 121 and port 111. A second piston 130 is also disposed within the cylinder 117 and is slidably sealingly mounted on the periphery of the power cylinder 122. A hydraulic chamber 131 is therefore defined between the small and large diameter portions 122a, 122b and the inner periphery of the second piston 130. A supplemental piston 132 is disposed at the right end portion of the cylinder 117 and is carried by a plunger 149 which is slidably disposed in the second and third housings 114, 115. The supplemental piston 132 is operatively engaged with the piston 130 and a projection 132a of the supplemental piston 132 fits into a recess 126a of the piston 126. A spring 135 is disposed within the cylinder 117 and normally biases the piston 130 in a rightward direction. Numerals 133, 134 denote spring retainers for the spring 135.

A plug body 138 is threaded into the second housing 114 and functions as a switch member. A plunger 139 is disposed in the plug body 138 and is at the left end thereof exposed to the cylinder 117 of the first housing 113 to be in contact with the supplemental piston 132. A snap action spring 140 is caused to be in contact with a switch contact 141. Numerals 142, 143 are switching contacts electrically connected to the computer means 38. A recess 136 is provided within the second housing 114 and a spring 145 is disposed between the recess 136 and the supplemental piston 132 and normally biases the latter in the leftward direction. A penetrating bore 146 is also provided within the second housing 114 and an air filter 147 is disposed therewithin. A guide member 148 is disposed in the second housing 114 and slidably carries plunger 149. A stepped cylinder 150 is provided within the third housing 115 and a plug body 153 is threaded into a large diameter portion 150a of the cylinder 150. The plug 153 has a port 112a and passage 154 connected to a chamber 155. A plug body 156 is also threaded into the plug body 153 and has a valve body 157 therein which is engaged with the plunger 149. A conical surface 156a is provided at the right end of plug 156. The valve body 157 has at the right end thereof a ball valve 157b which is maintained on a spring retainer 160 disposed within the plug body 153. A spring 159 is disposed between the retainer 160 and the plug body 153 and engages the retainer 160 with the ball valve 157b to bias the latter in the leftward direction. Numerals 170, 171 and 172 of the ports 110, 111 and 112a are seats fitted in the respective bores.

Figure 3:
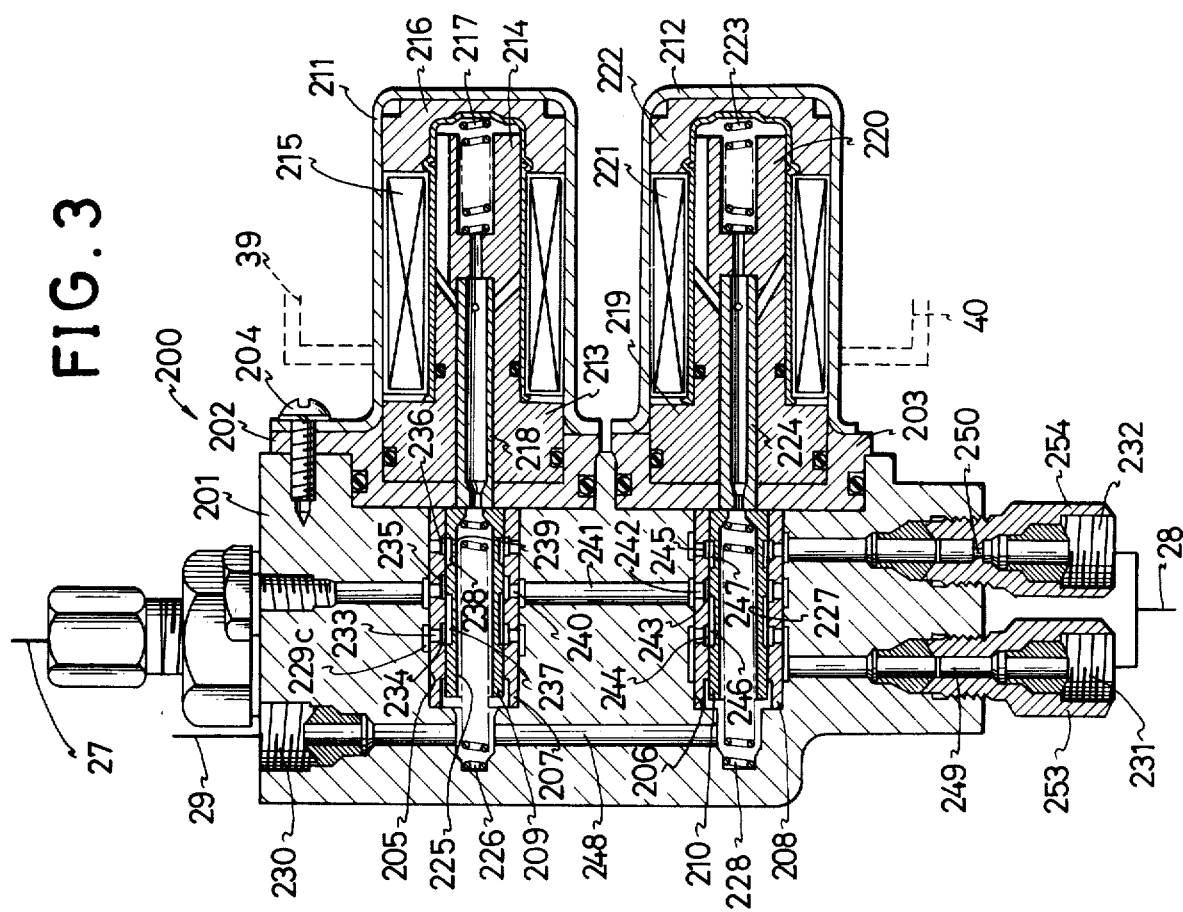
FIG. 3 is a longitudinal section view taken along A—A of FIG. 2.
Figure 2:
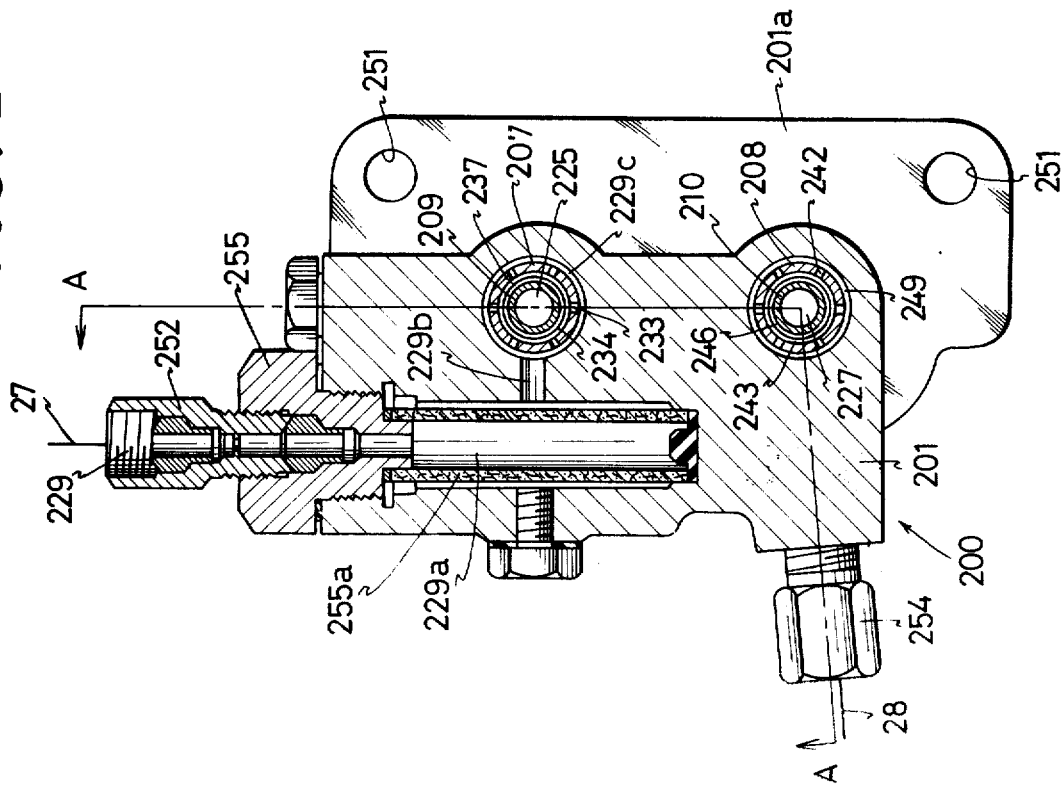
FIG. 2 is a vertical section view of a control valve assembly 200 of FIG. 1.

In FIGS. 2 and 3 the construction of the control valve assembly 200 is described in detail. First and second housings 201 and 202 are secured to each other by bolts 204 together with covers 211 and 212. The first housing 201 is formed with two cylinders 205 and 206 open at the right ends, as seen in FIG. 3, and housings 207 and 208 are respectively fitted within the cylinders 205 and 206. Pistons 209 and 210 are slidably disposed within the housings 207 and 208, respectively. The open ends of the two cylinders 205 and 206 are closed by the second housing 202 so as to prevent the leakage of hydraulic fluid. Between the second housing 202 and the cover 211 is disposed a solenoid coil 215 which is electrically connected to the computor means 38 via the conductors 39, as is shown in FIG. 1. A moving core 214 is disposed in the solenoid coil 215 between housings 213 and 216 and is operatively connected to a plunger 218 movably disposed in the housing 213. Similarly, between the second housing 202 and the cover 212 is disposed a solenoid coil 221 which is electrically connected to the computor means 38 via the conductors 40. A moving core 220 is disposed in the solenoid coil 221 between housings 219 and 222 and is operatively connected to a plunger 224 movably disposed in the housing 219. Springs 217 and 223 are for preventing the rattling of the moving cores 214 and 220 respectively. The piston 209 includes a cylinder 225 in the central portion thereof which is open at the left end thereof and is urged in a rightward direction by a spring 226 provided between the first housing 201 and the piston 209. The right end of the piston 209 is in contact with the plunger 218 of the housing 213. Similarly, the piston 210 includes a cylinder 227 in the central portion thereof which is open at the left end thereof and is urged in a rightward direction by a spring 228 provided between the first housing 201 and the piston 210. The right end of the piston 210 is in contact with the plunger 224 of the housing 219. In the first housing 201 are formed four ports 229, 230, 231 and 232. The port 229 is in communication with the accumulator 23 via the conduit 27, the port 230 is in communication with the reservoir 30 via the conduit 29 and the remaining ports 231, 232 are in communication with the actuator 100 via the conduit 28, as is shown in FIGS. 1 through 3.

The housing 207 is formed with two ports 233 and 239, port 233 being in communication with the port 229 via annular groove 229c and passages 229a and 229b while port 239 is in communication with a central passage 241 provided in the housing 201 between the housings 207 and 208. Formed in the housing 207 are three chambers 234, 235 and 236. Chamber 234 is in communication with the port 233, chamber 235 is in communication with the port 240 and both chambers are also in communication with an annular groove 237 provided within the piston 209. A further annular groove 238 is provided within the piston 209 and is in communication with the chamber 236 of the housing 207. Similarly, the housing 208 is formed with a port 242 which is in communication with the central passage 241. Furthermore three chambers 243, 244, and 245 are provided within the housing 208. Chamber 243 is in communication with the port 242 and a groove 246 which is provided in the piston 210. Chamber 244 is in communication with the groove 246. Chamber 245 is in communication with a groove 247 further provided in the piston 210. The two ports 231 and 232 are respectively communicated with the grooves 246 and 247 of the piston 210 through the housing 208.

Plugs 253 and 254 are threaded into the housing 201 to form the two ports 231 and 232, and also provide passages 249 and 250 respectively therein. The effective diameter of the passage 249 is larger than that of the passage 250.

An extending portion 201a of the first housing 201 is provided with a plurality of holes in which well known attaching bolts, not shown, are threaded for securing the control valve 200 to the vehicle body, not shown. In operation:

In the event that hydraulic pressure is not stored in the accumulators 23 and 24, and accordingly the pressurized hydraulic fluid is not transmitted into the chambers 129 and 131 of the actuator 100, the plunger 149 is moved in a rightward direction by the biasing force of the spring 135. Therefore the ball valve 157b of the valve body 157 would be separated from the conical surface 156a of the valve seat 156 against the biasing force of the spring 159. Consequently the braking pressure generated in the master cylinder 11 would be transmitted to the wheel brake cylinders 18a of the wheels 18 via conduit 17, port 112a, chamber 150a, passage 158, and conduit 37 such that normal braking operation can be obtained.

In the event that hydraulic pressure is stored in the accumulators 23 and 24, and accordingly, the pressurized hydraulic fluid is transmitted into the chambers 129 and 131 of the actuator 100, the piston 130 is moved in a leftward direction against the biasing force of the spring 135 by the hydraulic pressure in the chamber 131. The plunger 149 is, however, moved in a rightward direction to separate the valve body 157 from the conical surface 156a of the valve seat 156 due to the hydraulic pressure in the chamber 129. Therefore, the normal braking operation can also be performed.

In the event that the wheels are likely to be locked as a result of the stepping force of the brake pedal 10 being too great, or the value of the adhesive coefficient (($\mu$)) between the tires and the road surface being smaller than desired under the aforementioned condition, the computor means 38 causes current to flow into the solenoid coil 215 of the electro-magnetic valve assembly 200. Therefore, the plunger 218 is displaced in a leftward direction with the moving core 214 in FIG. 3, and accordingly, the piston 209 is also displaced to the left.

Spring 145 urges the piston 132 in a leftward direction so as to assist the plunger 149 to move to the left under fluid pressure in chamber 150a. Unless spring 145 is provided, the sliding resistance applied on plunger 149 by seals 151 and 152 will tend to obstruct the smooth sliding of plunger 149 when the fluid pressure in chamber 150a is relatively low. The pressurized hydraulic fluid in the groove 237 which has been in communication with the central passage 241 is now interrupted, and instead the pressurized hydraulic fluid flows into the cylinder 225 of the piston 209 which is connected to the reservoir 30 via the port 230 and the conduit 29. Thus, the pressurized fluid in the chamber 129 of the actuator 100 flows back to the reservoir 30 via conduit 28, port 231, passage 249, housing 208, central passage 241, cylinder 205 of housing 207, port 230, and the conduit 29. Therefore, the plunger 149, as well as the piston 156 of the actuator 100, is moved in a leftward direction by the hydraulic braking pressure, and the ball valve 157b is brought into contact with the valve seat 156 to close communication between passage 155 and passage 157a of the valve body 157. Simultaneously with the valve closing operation, the effective volume of the cylinder 150, 150a is increased due to the leftward displacement of the plunger 149. Thus, the braking pressure in the wheel brake cylinder is lowered to moderate the braking force, and the rotational speed of the rear wheels 18 can be restored. After restoration of the wheel condition, the computor means 38 again causes current to stop flowing into the solenoid coil 215. Thus, flow of pressurized fluid is restored to supply the accumulator pressure into the chamber 129 of the actuator 100 via conduit 27, control valve, 200, conduit 28, port 111 and passage 124. The plunger 149 and piston 126 of the actuator 100 are moved to the right by the hydraulic pressure in the chamber 129 against the braking pressure to separate the ball valve 157b from the conical surface 156a of the valve seat 156 so as to restore normal braking operation.

Repetition of this operation at a high speed prevents locking of rear wheels 18, whereby the anti-skid device may be deemed to be in its operative condition.

When the solenoid coil 221 of the control valve assembly 200 is energized by the computer means 38, which may only occur while the anti-skid device is in its operative condition, the moving core 220 is moved to the left to displace the piston 210 to the left whereby communication between the groove 246 of the piston 210 and the groove 243 of the housing 208 is interrupted and the groove 243 is put into communication with the groove 247 of the piston 210. Therefore, the pressurized hydraulic fluid thus flows into the smaller diameter passage 250 instead of the large diameter passage 249, and the fluid flow speed can be changed by only changing to the diameter of the passage 250 of the control valve assembly 200.

Thus, during the repeated pressure increasing and reducing modes of the anti-skid device operative condition, it is desirable that the pressure reducing operation should be sudden and the pressure increasing, or restoring, operation should be gradual, and therefore, in the pressure reducing operation, fluid pressure in the chamber 129 may be rapidly discharged into the reservoir 30 through the large diameter passage 249 and, in the pressure increasing operation, or the restoring operation, fluid pressure from the pump 19 may be transmitted to the chamber 129 through the smaller diameter passage 250.

In addition, when the ball valve 157b is separated for an excessively long time from the conical surface 156a of the valve seat, due to some failure in the actuator 100, and accordingly the plunger 139 of the switch means 137 and the supplemental piston 132 are also separated from each other for an excessively long time, the switch member 137 is actuated to light the alarm lamp 42 so as to inform the driver of this unusual condition.

The guide member 148 and sealing members 151 and 152, which are carrying or supporting the plunger 149 of the actuator 100, have considerably greater sliding resistances than desired because they must be produced on a large scale to maintain a low unit price. Therefore, when the wheels are locked or likely to be locked because of the small value of the adhesive coefficient (($\mu$)) between the tires and the road surface, that is, in case the low braking pressure is applied under anti-skid operation, due to the large sliding resistance forces of the guide member 148 or sealing members 151 and 152, the plunger 149 might not be moved to the left to close fluid communication between the passages 155 and 157a against the low braking pressure. To obviate the above drawback, the spring 145 is disposed between the supplemental piston 132 and the recess 136 of the housing 114 and the biasing force of said spring 145 is considerably greater than that needed to overcome the sliding resistances of the guide member 148 and sealing members 151 and 152 so as to assure displacement of the plunger 149 against said resistances of the guide member 148 and sealing members 151 and 152 even when low braking pressure is applied under the skid condition.

Obviously many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An anti-skid brake mechanism comprising:
   a master cylinder generating hydraulic pressure;
   wheel brake cylinders;
   a hydraulic braking circuit connecting said master cylinder with said wheel brake cylinders;
   means for generating a skid sensing signal;
   a pump powered hydraulic pressure source;
   a reservior hydraulically connected to said pump powered hydraulic pressure source;
   a cut-off valve means interposed between said master cylinder and said wheel brake cylinders within said braking circuit for controlling the hydraulic communication therebetween;
   a hydraulic pressure reducing means interposed between said cut-off valve means and wheel brake cylinders within said braking circuit and including a housing, a piston member slidably fitted within said housing and cooperatively connected to said cut-off valve means;
   an electro-magnetic change-over valve means selectively communicating said pressure reducing means with said pump powered hydraulic pressure source and said reservoir in response to said skid sensing signal; and
   means for biasing said piston member of said hydraulic pressure reducing means against the sliding resistance of said piston member, said biasing means being capable of freely assisting the pressure reducing operation of said piston member through its full stroke extent and especially at an approximately final stage thereof, where the hydraulic pressure in said wheel brake cylinders has been considerably decreased under a skid braking operation.

2. An anti-skid brake mechanism as set forth in claim 1 further comprising switch means for detecting a failure in said hydraulic braking circuit and for providing an indication of said failure.

3. An anti-skid brake mechanism as set forth in claim 1 wherein said cut-off valve means comprises a ball valve engaged by and controlled by said piston member.

4. An anti-skid brake mechanism as set forth in claim 1 wherein said electro-magnetic change over valve comprises a pair of alternately functioning passages, one of said passages having an orifice therein and being of a lesser diameter than the other of said passages whereby hydraulic fluid passes through said orifice during a skid condition so as to reduce the speed of said fluid.

5. An anti-skid brake mechanism as set forth in claim 4 wherein said electro-magnetic change over valve further comprises first and second spool valves each being associated with respective solenoids, said first spool valve being actuable in response to detection of a skid condition to interrupt fluid flow to said cut off valve and direct said fluid flow to said reservoir, said second spool valve controlling fluid flow to said alternately functioning passages.

6. An anti-skid brake mechanism as set forth in claim 1 wherein said hydraulic pressure reducing means further comprises second and third pistons within said housings, said second piston having a cylinder formed therein for accomodating said third piston so as to form a hydraulic chamber, said second piston being fixed to said housing and said third piston being in direct contact with said first mentioned piston so as to control the movement of said first mentioned piston.

* * * * *